United States Patent [19]
Karklys

[11] 3,986,040
[45] Oct. 12, 1976

[54] INTEGRATED CIRCUIT APPLIANCE PROGRAMMER INCLUDING PROGRAMMER MODIFICATION FUNCTION

[75] Inventor: Joseph Karklys, St. Joseph, Mich.

[73] Assignee: Whirlpool Corporation, Benton Harbor, Mich.

[22] Filed: Sept. 17, 1974

[21] Appl. No.: 506,792

[52] U.S. Cl. .............................................. 307/141
[51] Int. Cl.² ..................... H01H 7/00; H01H 43/00
[58] Field of Search............. 307/141, 141.4, 141.8, 307/293; 328/130; 340/309.1

[56] References Cited
UNITED STATES PATENTS
3,774,056  11/1973  Sample et al. ...................... 307/141
3,840,752  10/1974  Eshraghian ......................... 307/141

Primary Examiner—David Smith, Jr.
Attorney, Agent, or Firm—Hill, Gross, Simpson, Van Santen, Steadman, Chiara & Simpson

[57] ABSTRACT

An appliance programmer, in particular an automatic washer programmer, employs a memory circuit and sequence control for establishing a predetermined program. The program may be altered by two techniques. A first technique includes the utilization of a circuit for sampling the circuit connections of the programmer so that any number of steps of the program can be varied to alter the entire program. This technique provides for the manufacture of an integrated circuit to establish a predetermined program and application of that circuit in a variety of appliances with different program requirements. A second technique utilizes operator control switches for manually altering the program and includes apparatus for locking out program modifications after a predetermined time interval at the initiation of program selection.

11 Claims, 5 Drawing Figures

INTEGRATED CIRCUIT APPLIANCE PROGRAMMER INCLUDING PROGRAMMER MODIFICATION FUNCTION

CROSS REFERENCE TO RELATED APPLICATION

This application is related to my co-pending application Ser. No. 506,838 filed on even date herewith.

BACKGROUND OF THE INVENTION

1. Field of the Invention

This invention relates to an appliance programmer, and is more particularly concerned with the provision of apparatus for altering a predetermined program of appliance operations wherein a delay is provided during the alteration process for a predetermined time period and further alterations after such time period are locked out.

2. Description of the Prior Art

U.S. Pat. No. 3,662,186, assigned to Whirlpool Corporation, discloses a programmer for an appliance, in particular a dishwasher, in which operator controlled manual switches may be selectively operated to alter the operation of the appliance. U.S. Pat. No. 3,685,022 discloses a numerical control for a machining apparatus which is prevented from operating until a tool code selection has been made by depressing one of a number of selection switches of a selection switch bank.

The prior art also recognizes the use of electronic timers and resettable clocks as evidenced by the aforementioned U.S. Pat. No. 3,662,186 and by U.S. Pat. Nos. 3,639,844 and 3,702,030.

SUMMARY OF THE INVENTION

An object of the present invention is to provide for operator selection of specific program options to modify the available program of an appliance.

A more particular object of the invention is to provide an appliance programmer having switches for manual altering the appliance program and a timing circuit which operates to prevent further program modification after the lapse of a predetermined time interval.

According to the invention, an appliance programmer, herein disclosed in the environment of an automatic washer, comprises a clock for supplying electrical pulses at discrete time intervals, a sequence control for establishing a sequence of appliance operations and a circuit connected to the clock and to the sequence control for providing a sequence of output signals corresponding to the desired program.

The memory circuit includes an input memory for receiving program modification instructions from a plurality of manual operator controlled switches, a read only memory for generating output signals, and an input encoder for encoding the information received from the input switches via the input memory to operate the read only memory.

The operator controlled switches are connected by way of AND gates to respective latch circuits which form the input memory and are fully connected to and control the operation of a timer, herein an eight second timer, which provides a predetermined delay time for further program modification. The timer is connected to a flip-flop which, in one state, feeds the AND gates to store information in the latch circuits, and in another state, locks other further information storage and aids a second set of AND gates in transferring the stored information to the input encoder.

A third set of AND gates is operative by the flip-flop in the last-mentioned state and an output decoder to energize corresponding light emitting diodes to indicate program progression. The connections of these AND gates to the light emitting diode circuits are shared in common with the circuit connections between the operator controlled switches and the first-mentioned AND gates.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
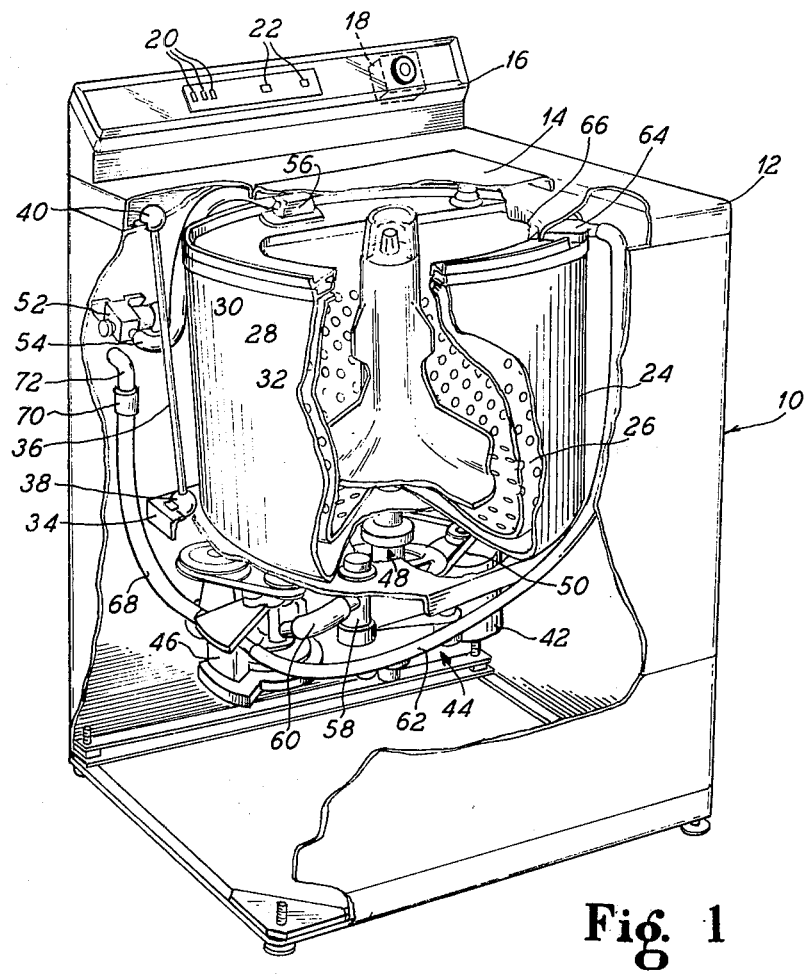
FIG. 1 is a perspective cut away view of an automatic washer which may embody the programmer of the present invention.

The automatic washer, as illustrated in FIG. 1, comprises a cabinet 10 including a cabinet top 12 having a lid 14 and a console 16. The console 16 is provided with a programmer 18, a plurality of operator controls 20, and a plurality of indicator lamps 22 to control and monitor the operation of the washer. The operations controlled by the programmer include a washing operation in which the clothes are agitated to remove soil, a draining operation in which the washing liquid is removed from the machine and a spinning or extraction operation in which the clothes are centrifuged to remove more liquid from the fabric.

A tub 24 has a concentric perforate basket 26 therein for receiving clothes to be washed. A tub ring 28 is provided to prevent splash from the washing action from flowing over the top of the tub. The tub ring 28 is provided with an opening 30 through which clothes are received into the basket 26. An agitator 32 is provided within the basket 26 to impart a washing action to the clothes.

The tub 24 is supported by a base plate 34 which is suspended from the cabinet 10 by three suspension rods, rod 36 being the only such rod illustrated. The rod 36 is connected to the base plate 34 by a resilient member 38 and to the cabinet 10 by a resilient member 40.

A motor 42 and a transmission 44 are suspended from the base plate 34 and provide a means of driving the agitator 32 and the basket 26. A valve pump 46 is provided to circulate the washing liquid during the washing operation and to remove the liquid from the tub 24 during the draining and spinning operations. A clutch and brake assembly indicated at 48 allows for engagement of the agitator 32 for oscillatory motion during the washing operation, while holding the basket 26 stationary, and for disengagement of the agitator 32 and engagement of the basket 26 for spinning of the basket during the spinning operation. The transmission 44, the pump 46, and the clutch and brake assembly 48 are driven by the motor 42 by means of a drive belt 50.

Water flows into the machine through a programmer controlled solenoid valve 52, through a conduit 54 and an antisyphon device 56 into the tub 24. During the washing operation, washing liquid is circulated from the tub 24 by suction from the valve to pump 46 through a button trap 58 and a conduit 60, and is pumped through a conduit 62 to a filter 64. The water flows through the filter where particles, such as lint, are removed and the filtered water flows through the discharge end of the filter into the basket 24 through the tub ring opening 30. The filter is mounted through a vertical flange 66 of the top 12 so as to overhang the opening 30. During draining of the tub 24, the pump valve is operated and wash liquid flows from the tub 24 through the button trap 58 and the conduit 60 to the pump 46. The wash liquid is then pumped through a conduit 68, a check valve 70 which allows flow of liquid in this direction only, and a conduit 72 to a drain (not shown).

Figure 2:
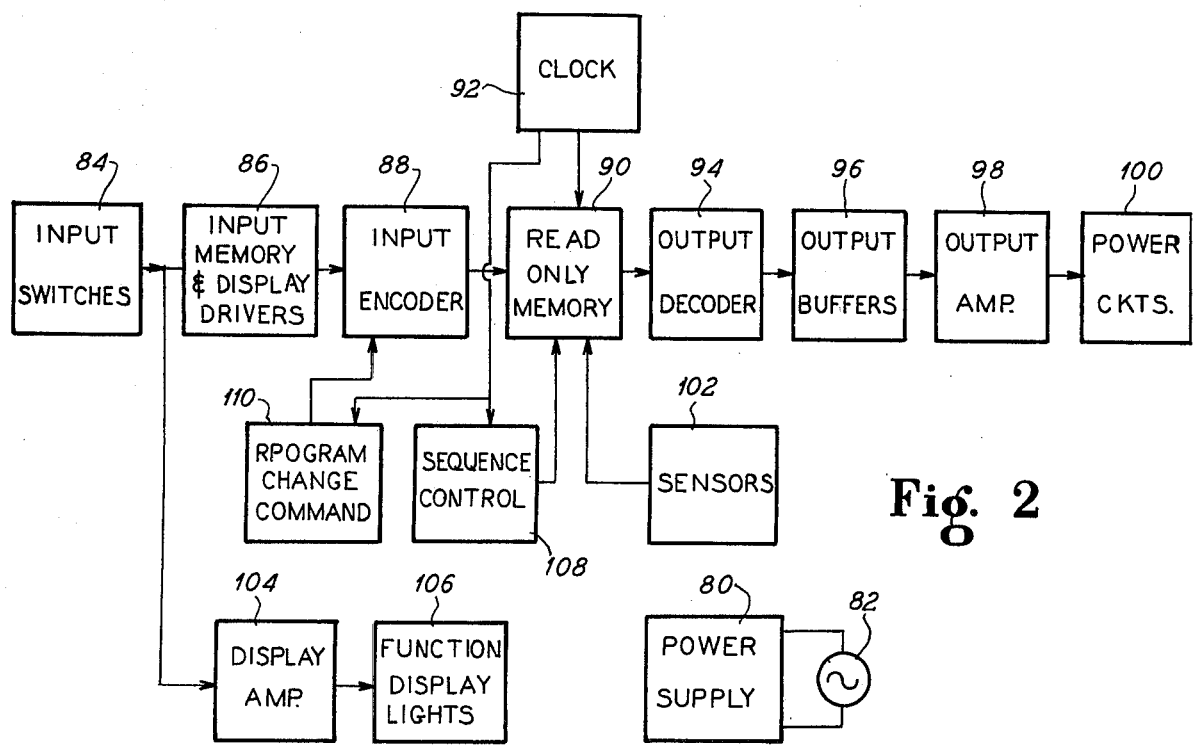
FIG. 2 is a schematic block diagram of a programmer constructed in accordance with the present invention.

Referring to FIG. 2, a schematic block diagram of the programmer 18 is generally illustrated as comprising a power supply 80 which is connected to a commercial electrical supply 82, such as 125 VAC, 60 Hz. The individual power connections to the individual circuits have been omitted for the sake of clarity. It is, however, well known in the art to derive timing pulses and establish a programming sequence with clocked pulses derived from a commercial line supply.

Figure 5:
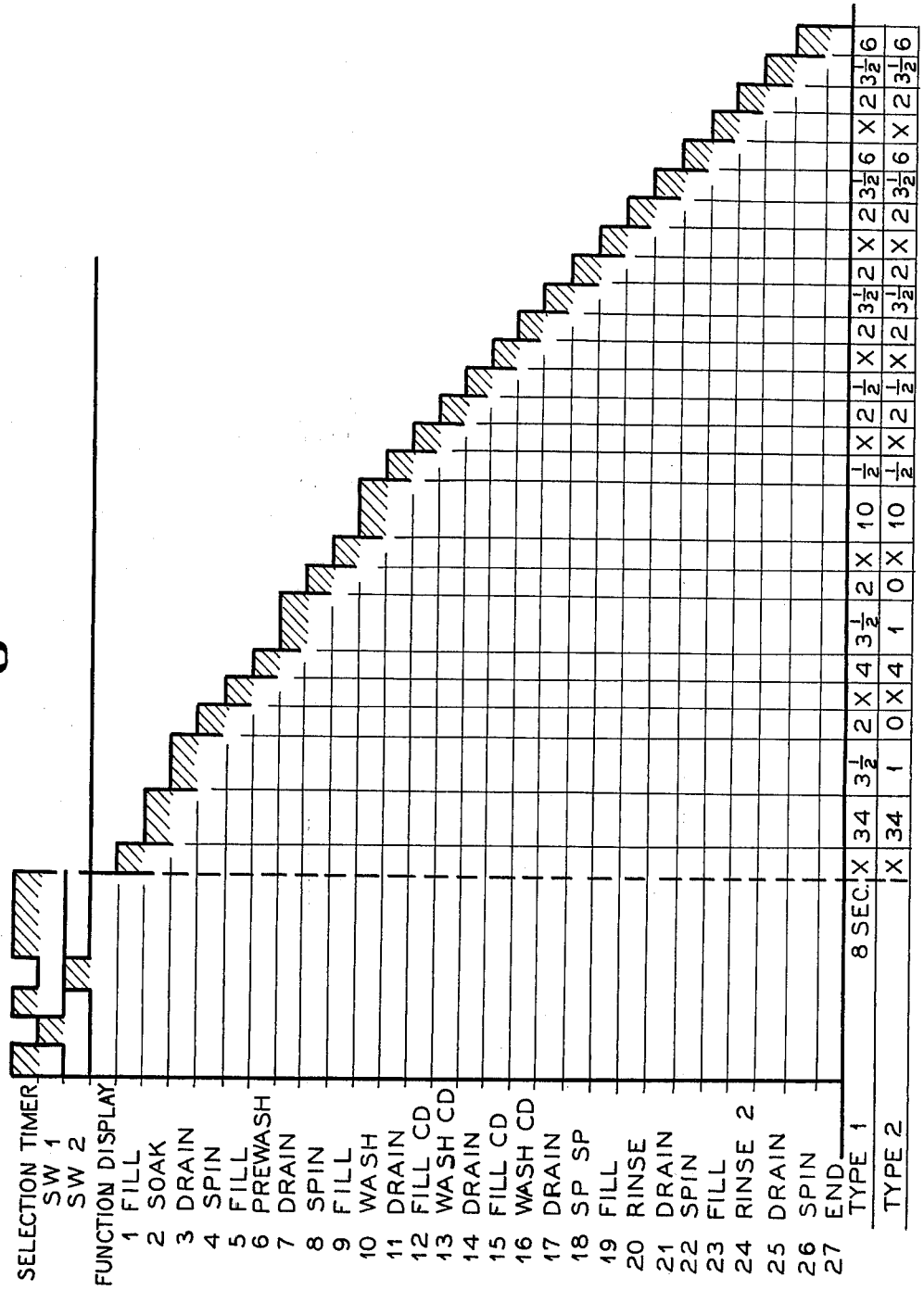
FIG. 5 is a program chart illustrating a predetermined program and program modification in accordance with the principles of the present invention.

The program comprises a number of program steps which are set forth at the left hand side of FIG. 5 and which consist of filling, washing, draining and spinning functions. An operator may elect to eliminate certain ones of these steps and for this purpose, several operator switches 84 are provided which, when depressed, will alter the basic cycle as shown in FIG. 5. The switches 84 are connected to an input memory and display driver circuit 86 which stores the information regarding the desired program modification. The input memory is connected to an input encoder 88 which provides a specific output for certain combinations of inputs. By way of example, the input encoder may comprise a number of AND gates. The information from the input encoder is provided to a read only memory 90 which, by way of example, may comprise a matrix. The matrix provides outputs only for a predetermined number of inputs, as is well known in the art. Therefore, for example, when a specific input switch has been depressed and a sequence control 108 provides a certain output, and a clock 92 provides a clock pulse, the read only memory 90 will provide a specified output to an output decoder 94. The output decoder 94 is connected by way of output buffers 96 and output amplifiers 98 to a plurality of power circuits 100, hereinafter called output circuits which perform the various operations of the program, including the opening and closing of the valves for filling and draining and shifting for agitation and spin.

The sequence control 108 is provided for establishing the sequence of steps in the operating cycle of the appliance as illustrated in FIG. 5. This sequence control can be constructed similar to that illustrated in the aforementioned U.S. Pat. No. 3,662,186.

The read only memory also receives inputs from sensors 102 such as, for example, a water level switch which indicates that a desired water level has been established within the tub 24. As mentioned above, the read only memory provides an output to an output decoder which decodes the information of the read only memory and feeds the same to output buffers from which the information is routed to the output amplifiers and the power circuits which operate the appliance.

The automatic washer can also be provided with function display lamps (not shown) connected in the circuit beyond the decoding operation to indicate the progression of the washing program.

In the embodiment illustrated in FIG. 2, function display lights 106 are energized by a display amplifier 104 which receives its input from the display drivers associated with the input memory, referenced 86. The display lights 106 may advantageously comprise light emitting diodes, although other types of display lights may also be used. The function of display lights 106 is to indicate which machine functions have been selected by the operator by means of the input switches. The display lights may also be used to indicate the progression of the washing program.

So far the description hereinabove has only been concerned with circuits which are well known in the art. New techniques for altering the predetermined program are set forth below with specific reference to FIGS. 3–5, for the inventions claimed in this and my aforementioned copending application.

Figure 3:
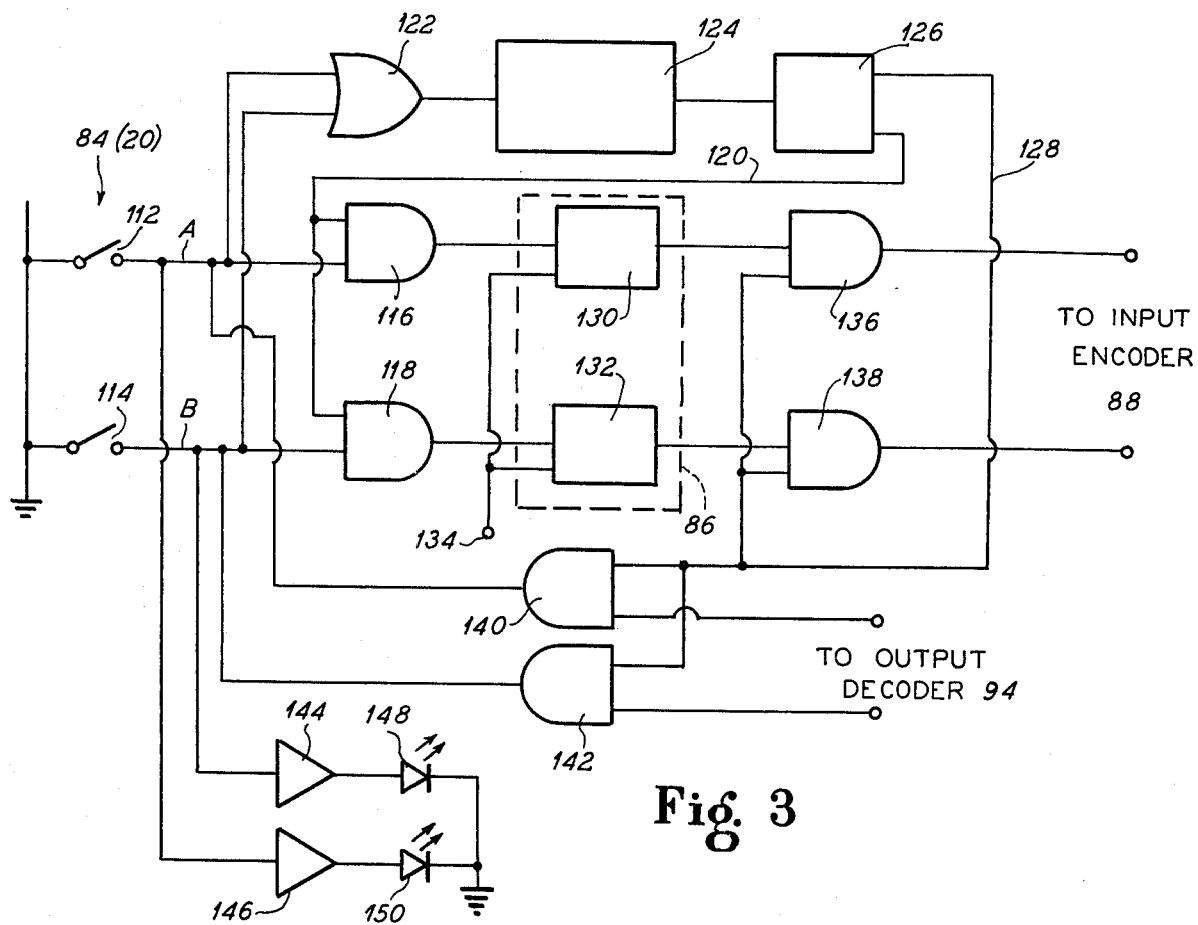
FIG. 3 is a schematic logic diagram of an operator controlled program modification circuit which may be employed in the circuit of FIG. 2.

Referring to FIG. 3, apparatus for operator controlled manual alteration of the program at the beginning of a cycle is illustrated. The purpose of this structure is to allow the operator a specified amount of time in which to modify the basic program and exercise available program options. Once that amount of time elapses, the programmer will lock out any further options selected by the operator. Each time the operator selects another option within the specified time, a clock is reset and begins counting toward the specified amount of time.

In FIG. 3 the input switches 84 have been illustrated in detail as comprising a pair of switches 112 and 114 which may be inexpensive momentary switches and which may be depressed by the operator to select specific types of options. By way of example, the operator may elect to skip specific steps in the program illustrated in FIG. 5. By depressing the switches 112 and 114, respective inputs are applied to a pair of AND gates 116 and 118. The other inputs of these AND gates are connected to a flip-flop 126 and until a reset pulse is received by the flip-flop 126 an output will appear which is fed to the gates 116 and 118. Therefore, the gates 116 and 118 will produce an output which is fed to a pair of latch or memory circuits 130 and 132. These latches represent the input memory 86 of FIG. 2 and include a "clear" input 134 which is energized at the beginning of the program cycle. This may be a reset pulse from the clock, such as by way of a single shot flip-flop.

The output of the latches are provided to two AND gates 136 and 138, which also receive inputs from the reset side of the flip-flop 126 by way of connection 128.

The switches 112 and 114 are also connected to an OR gate 122, which provides a pulse to a timer 124 whenever one of the switches 112, 114 is actuated. Therefore, the timer is reset each time one of the switches is actuated. If the timer is not reset for a period of eight seconds, for example, the timer will provide an output pulse which will reset the flip-flop 126 and remove the inputs supplied thereby to the AND gates 116 and 118 so that any further actuations of the switches 112 and 114 is locked out.

At this time, however, the AND gates 136 and 138 are opened by the signal on the reset output 128 of the flip-flop 126 to provide respective output pulses to the input encoder 88.

The input encoder 88 processes this information to alter the basic program of the appliance. The flip-flop 126 also provides inputs for a pair of AND gates 140 and 142 which receive respective inputs from the output decoder 94 corresponding to the altered sequence. The gates 140, 142 drive the light emitting diodes 148 and 150 by way of respective amplifiers 144 and 146 to indicate progression of the altered program.

It should be noted that the light emitting diodes 148 and 150 are energized by way of circuit connections of the integrated circuit which include portions A and B which are shared with the connections of the operator switches 112 and 114.

Figure 4:
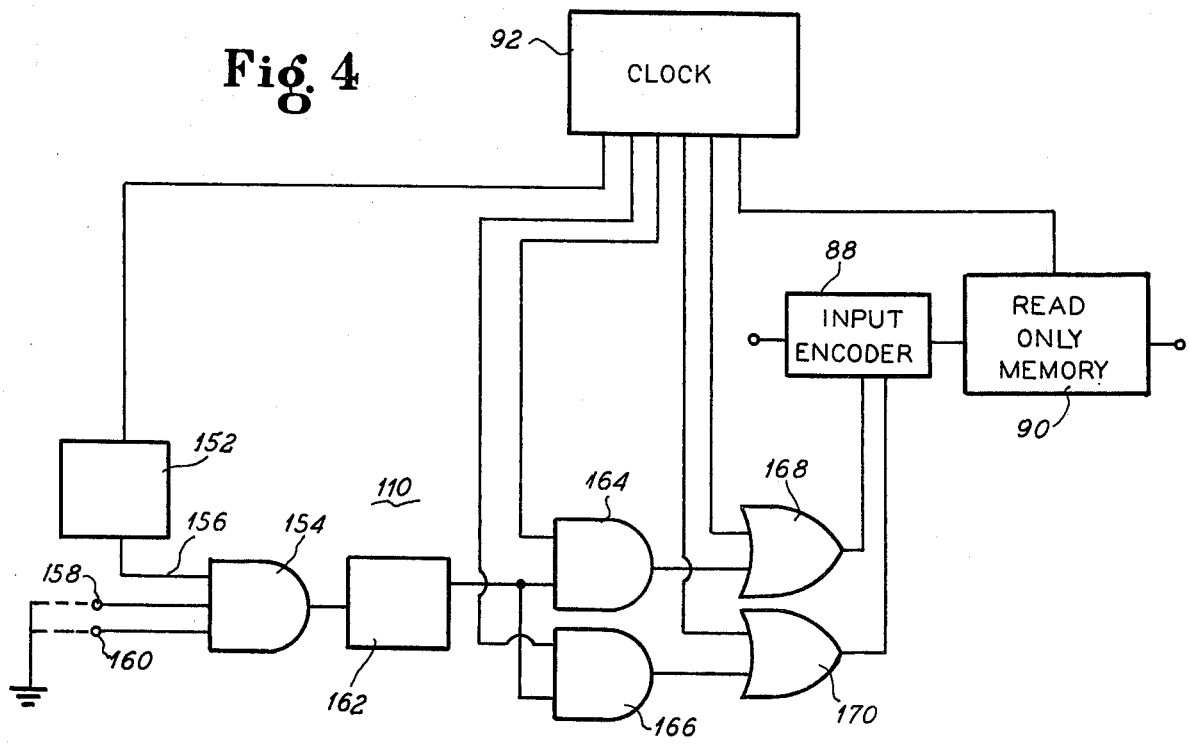
FIG. 4 is a schematic logic representation of a program change command circuit which may be employed in the circuit of FIG. 2.

Referring to FIG. 4, a program change command 110 is illustrated in detail as connected to the clock 92, the input encoder 88 and the read only memory 90. More specifically, the clock 92 has one output connected to a single shot flip-flop 152 which is in turn connected to an AND gate 154 at an input 156 of the AND gate, the AND gate 154 having other inputs 158 and 160 which are illustrated as connected to ground by means of broken lines. If it is desired to utilize a first type of program, these lines may be left unconnected or may be connected to a first source of reference potential; however, when a second type of program is desired, the inputs 158 and 160 are connected to ground, or to a second source of reference potential.

As to the difference between a first type of program and a second type of program, reference may be taken to FIG. 5 in which two types of programs are illustrated. In FIG. 5 it is shown that steps 3, 4, 7 and 8 vary between the programs referenced TYPE 1 and TYPE 2. Therefore for the first type of program 3½ minutes of drain are shown in step 3, whereas only 1 minute is shown for the second type of program. As another example, the first program has 2 minutes of spin in step 4; whereas, no time has been allotted for spin in the same step of the second program. Similarly, for the first program step 8 includes 3½ minutes for drain; whereas, no drain time has been allocated for the second type of program. Of course, other changes could be incorporated as desired.

In FIG. 4, the inputs 158 and 160 of the AND gate 154 may be terminals of an integrated circuit which is provided as a universal circuit for a variety of machines which have different programming requirements. When the integrated circuit is used in a TYPE 1 appliance, the terminals may be left unconnected to ground or some other suitable voltage source. At the beginning of each program, the type of connection of these terminals will be sampled by the programmer and the program which is utilized will be based on the results which are detected by the sampling mechanism. Therefore, in FIG. 4 a single shot flip-flop 152 is energized when the appliance is first turned on. The AND gate 154 will therefore provide an output only when the terminals 158 and 160 are connected to ground. This output is fed to a latch 162 whose output is, in turn, fed to a pair of AND gates 164 and 166.

The AND gates 164 and 166 receive inputs from the clock 92 in the form of respective unique electrical pulses. Therefore, and with reference to FIG. 5, the AND gate 166 may receive a clock pulse very shortly after initiation of the program cycle, for instance, 16 milliseconds after inititation of the cycle. The gate 164 may receive a pulse from the clock 1 minute after the initiation of the cycle. The outputs of the AND gates 164 and 166 are connected to respective OR gates 168 and 170. The OR gate 168, in this particular example, controls the drain function and the OR gate 170 controls the spin function. The OR gates 168 and 170 also receive inputs from the clock as illustrated in FIG. 4. Therefore, assuming that an output is provided by the AND gate 164 after 1 minute of operation of the cycle, then the OR gate 168 will provide an output to the input encoder 88 to terminate the drain function after 1 minute of operation. Similarly, when an output is provided by the AND gate 166 very shortly after initiation of the cycle, the OR gate 170 will provide an output to the input encoder 88 to all of the programs so as to eliminate the spin step 4. However, when no output is provided from the AND gates 164 and 166, the clock pulses fed to the OR gates 168 and 170 control the drain and spin steps 3 and 4. Therefore, it can be seen that additional OR gates may be provided to alter the basic machine program so that the simple technique of selective wiring of terminals of the integrated circuit provides the manufacturer with universality of the circuit and flexibility in utilizing the circuit in machines having different program requirements.

Looking back then, the programmer set forth herein, and in my aforementioned co-pending application, is provided with a basic program whose sequence of operations is defined by a sequence of output signals from a read only memory under the control of a sequence control circuit. This basic program may be automatically altered by a program change command circuit which is incorporated in the programmer circuit and which scans certain terminals of the circuit to determine the particular program application of the circuit. This automatic altering of the program, in effect, provides the particular appliance in which the circuit is incorporated with its own unique basic program as far as the operator of the appliance is concerned. The operator of the appliance is, however, provided with additional flexibility in utilizing the appliance through the provision of switches for selectively altering this unique basic program. Therefore, the programmer disclosed herein provides both the manufacturer and the consumer with programming flexibility through simple, yet effective, techniques.

Although I have described my invention with reference to a particular illustrative embodiment thereof, many changes and modifications of the invention may become apparent to those skilled in the art without departing from the spirit and scope of the invention.

Having described the invention, the embodiments of the invention in which an exclusive property or privilege is claimed are defined as follows:

1. In an appliance which performs a plurality of operations, an electronic control for stepping the appliance through an operating program comprising a sequence of the operations, said electronic control comprising:
   a clock for supplying electrical pulses at discrete time intervals;
   a sequence control for establishing a sequence of appliance operations;

a set of operator controls for modifying said sequence and including means for preventing sequence modification, after a predetermined interval, in response to operation of an operator control;

a memory circuit connected to said operator controls, to said clock and to said sequence control for generating a sequence of output signals; and a plurality of output circuits connected to said memory circuit for performing said operations in response to said sequence of signals.

2. An appliance according to claim 1, wherein said set of operator controls comprises a plurality of switches and said means for preventing sequence modification comprises a timing circuit connected to said switches and operable upon operation of a switch to inhibit information transfer from said switches to said memory after a predetermined interval.

3. An appliance according to claim 2, wherein said memory circuit includes an input memory connected to said switches to receive sequence modification signals;

an input encoder connected to said input memory for encoding a sequence modification; and a read only memory connected to said encoder for providing said output signals and wherein said means for preventing sequence modification is connected to said input encoder.

4. In an appliance which performs a plurality of operations, an electronic control for stepping the appliance through an operating program which comprises a sequence of the operations, said electronic control comprising:

a clock for supplying electrical pulses at discrete time intervals;

a sequence control for establishing a sequence of appliance operations;

a set of operator switches for modifying said sequence;

a memory circuit connected for generating a sequence of output signals, said memory circuit including an input memory connected to said switches, an input encoder connected to said input memory and a read only memory connected to said input encoder for generating said signals;

a plurality of output circuits connected to said read only memory for performing said operations in response to said sequence of signals; and timing means connected to said switches and operable a predetermined time after the operation of a switch to prevent further program modification.

5. An appliance according to claim 4, comprising an OR gate connected between said operator switches and said timing means for operating the latter in response to the operation of any of said operator switches.

6. An appliance according to claim 4, wherein said timing means includes a timer connected to said switches and operable in response to operation of a switch to time said predetermined time and provide a signal at said predetermined time;

a plurality of latch circuits connected to said switches and forming said input memory;

gating means connected to said latch circuits and to said input encoder; and gate opening means connected between said timer and said gating means for opening said gating means in response to said timing circuit signal.

7. An appliance according to claim 6, wherein said gating means includes a plurality of AND gates each having an output connected to said input encoder, a first input connected to a respective latch circuit and a second input, and said gate opening means includes a flip-flop connected between said timer and said second inputs of said AND gates and operable to cause information transfer from said latch circuits to said input encoder upon timing of said predetermined time.

8. An appliance according to claim 7, comprising an output decoder connected between said memory circuit and said output circuits and indicator means connected to said output decoder for indicating the progression of said program.

9. An appliance according to claim 8, and including circuit connections shared by said operator switches and said indicator means.

10. An appliance according to claim 8, wherein said indicating means comprises a plurality of visual indicators, and a plurality of AND gates connected to said visual indicators and connected to and operated by said decoder and said flip-flop to indicate operations of said program.

11. In an appliance having a programmer which is operable to step the appliance through a basic sequence of operations and operator switches which may be operated to alter the basic program, the improvement therein comprising first means connected to the operator switches for timing a predetermined interval upon the operation of any of the switches, second means connected to the operator switches for storing information representing operation of the operator switches, third means connected to said first means for locking out the effect of further switch operation after said predetermined interval, and fourth means connected to said second and third means for causing the programmer to operate in accordance with the altered program.

* * * * *